Patented Apr. 9, 1940

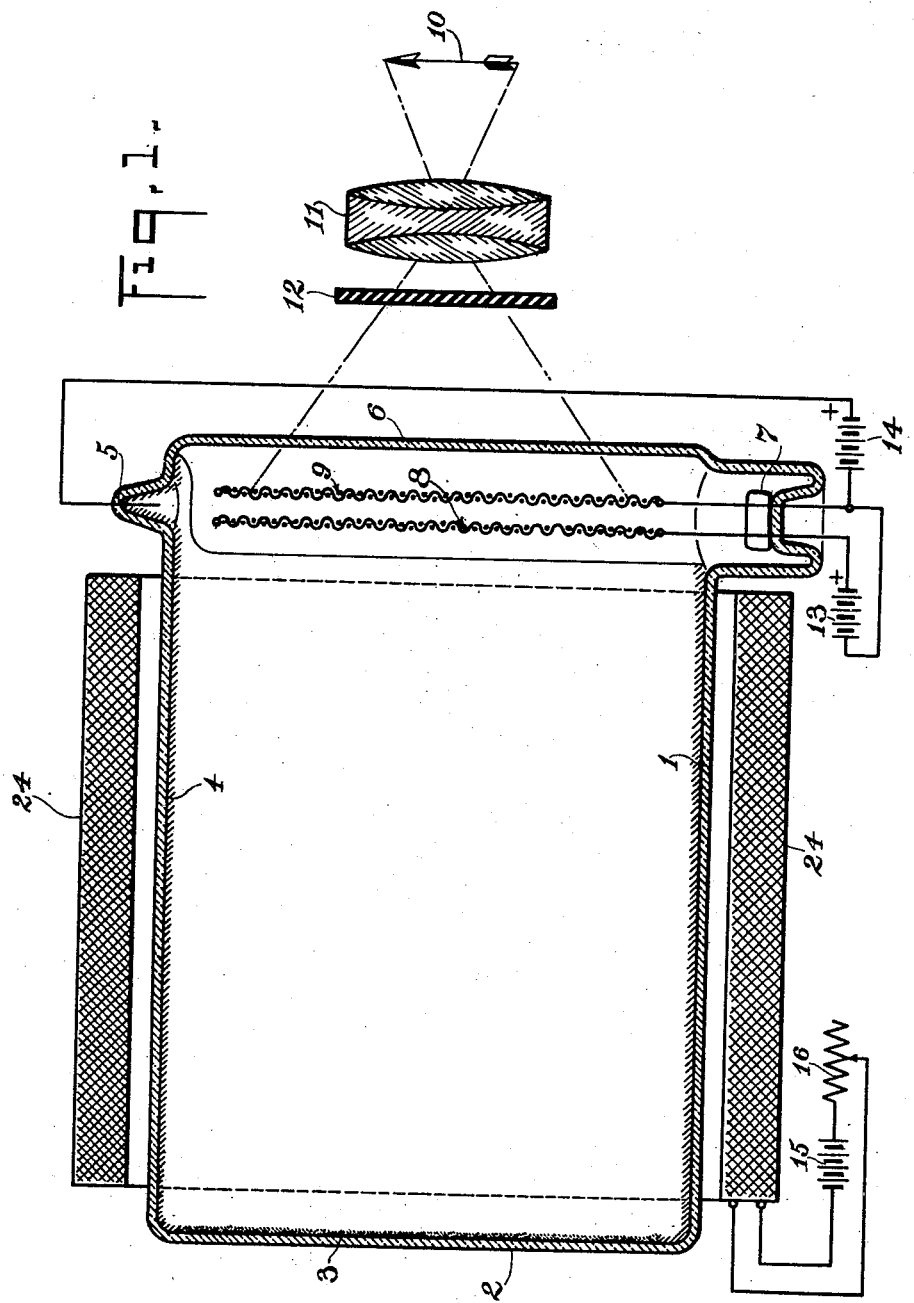

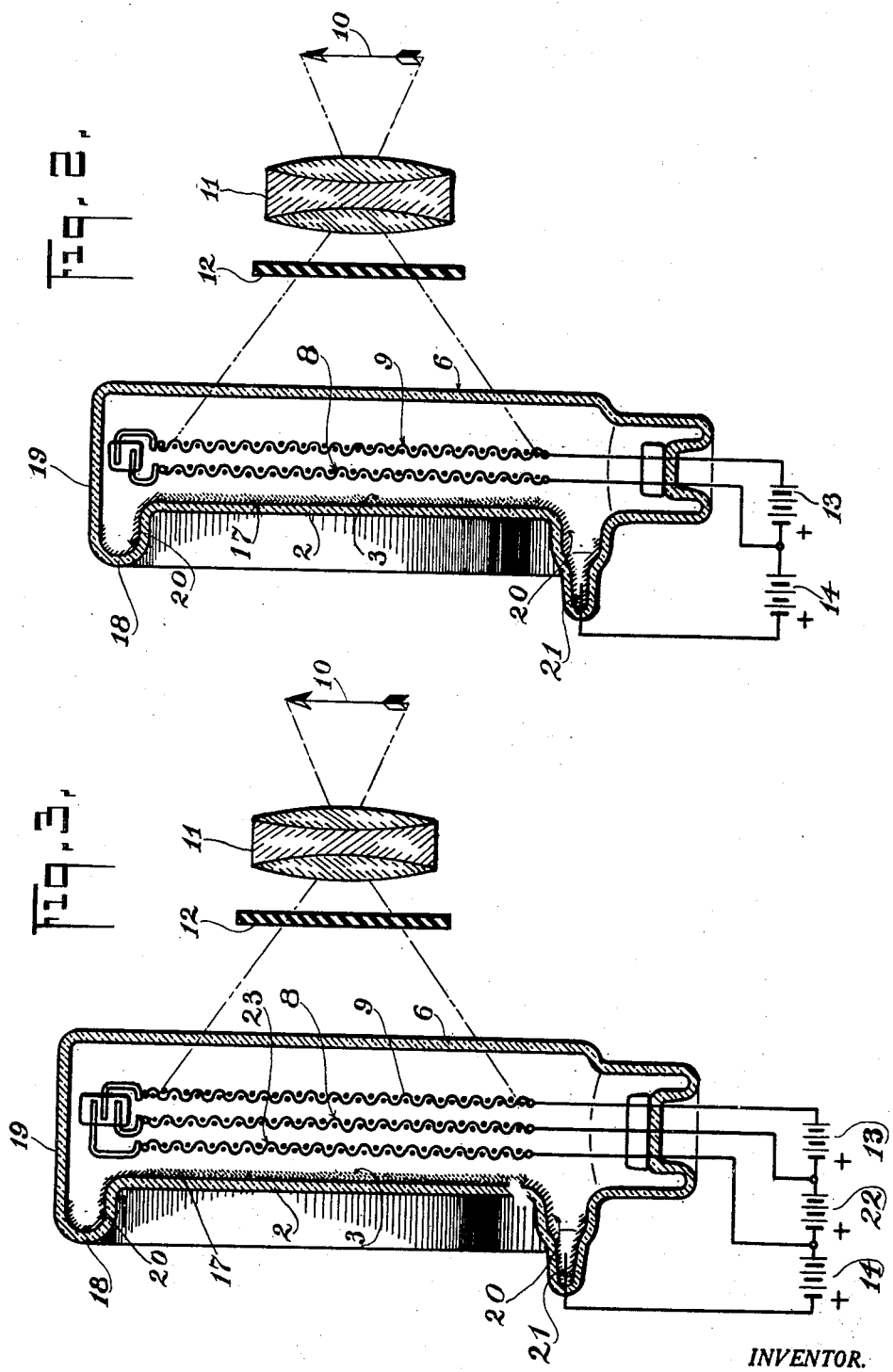

2,196,691

UNITED STATES PATENT OFFICE 2,196,691

ELECTRO-OPTICAL APPARATUS

John C. Batchelor, New York, N. Y.

Application March 20, 1935, Serial No. 11,961

4 Claims. (Cl. 250—166)

My invention relates to improvements in apparatus for use to make possible vision through fogs, clouds, vapors, rain, smoke and the like by electrical means.

More particularly, my invention relates to an electrical, non-mechanical device which is capable of translating images made up of invisible radiation into substantially identical images except made up of radiations to which the human eye is sensitive. Such a device may aptly be called an optical wave frequency changer.

In the art of navigation and other arts, it has been customary in the past to detect the presence of objects at points where they have been rendered invisible to an observer by intervening fogs or the like by taking advantage of the fact that such intervening bodies are often transparent to radiations lying adjacent the visible spectrum at the longer wave-length end. It is known, for example, that as the wave-length of a radiation approaches in magnitude the diameter of particles in an obscuring mass, the amount of the radiation absorbed and reflected by that mass decreases, and consequently the amount of transmitted radiation increases. Before the wavelength of the radiation has reached a value corresponding to the particle diameter of the intervening medium, the optical transmission has become quite appreciable, so that smokes, for example, which customarily have a particle diameter of ten microns or more, will transmit a usable invisible specular image in the infra-red region between the red threshold of visibility and ten thousand Ångström units.

Advantage has often been taken of this transmission characteristic in the infra-red region to produce photographs in that region of the spectrum in the presence of masses which obscure or diffuse visible radiations. As an example of this procedure, photographs of scenes at distances of from fifty to one hundred miles have been taken by using only the infra-red radiations reflected or radiated by the scene. Such a process would obviously have considerable value for use in navigation were it possible to produce and develop photographs of objects lying in the course of vessels or moving craft in a time sufficiently short that they might be examined and taken advantage of before the impeding objects had been overtaken. Present technique, however, limits the minimum time required for development of such photographs to the order of fifteen seconds, and the distance which most moving craft traverse in that time is such as to greatly reduce the value of such photographic methods of simulating vision through fogs and the like.

Because of the unsatisfactory nature of the results of the photographic method, and for other reasons, another method of simulating vision through fogs and the like has been proposed consisting of the use of a large parabolic reflector at the focus of which lies a bolometer or other device sensitive to infra-red radiations, and means for indicating the amount of radiation being focused on the sensitive device. Such a device is quite sensitive to invisible radiation; by this means the presence of ships has been detected at distances up to six miles; icebergs have been detected at similar distances; signalling at distances up to ten miles has been accomplished by the use of infra-red radiation.

In opposition to what appears to be the great utility of the reflector type of infra-red sensitive device is the fact that such a device provides no means for indicating the size, shape or proximity of the mass on which it is trained. Although it will detect the presence of aircraft at considerable distances, it is quite as sensitive to the presence of some types of clouds, so that such clouds may cause spurious readings on the instrument. Similarly, condensations in a fog at sea can often be mistaken for a ship, and much time can be lost in navigating around such condensations.

With the foregoing shortcomings of the existing devices in mind, it is an object of my invention to provide electrical means whereby vision through fogs, vapors, clouds, rain and smoke is made possible.

It is a further object of my invention to provide electrical means whereby vision in the dark and in the absence of visible radiations is made possible.

These and other objects will be apparent from the following description of my invention.

In accordance with my invention, a vacuum tube is provided comprising a fluorescent screen, photoelectrically sensitive member and an electron accelerating member, all contained within an evacuated glass container, and associated electrical circuits such that when an image is focused on the photoelectrically sensitive member, the photoelectrons which are emitted therefrom are accelerated and caused to impinge the fluorescent screen at positions corresponding to the points on the photoelectrically sensitive screen from which they were emitted, and the resulting fluorescence of the fluorescent screen will produce a visible image of the object.

Further, in accordance with my invention, I have in some cases interposed between the accelerating screen and the fluorescent screen described in the foregoing embodiment, one or more additional accelerating members, each having a constitution such that more than one secondary electron is emitted by the impact of each primary electron, and the secondary electrons are directed to the fluorescent screen with the result that in effect the number of primary photoelectrons has been amplified. For the purpose of referring to this type of amplification of the number of photoelectrons by secondary emission, I have found it convenient to use the term "cascade emission."

In order to facilitate a clear description of my invention, attention is directed to the accompanying drawings, of which Figure 1 is a diagrammatic representation of one form of my invention. Figure 2 is a similar representation of a modified embodiment of my invention. Figure 3 represents a still further modified form of the invention.

In Figure 1, a glass envelope 1, which may be cylindrical or other desired shape, is coated on the internal surface of the flat window 2 with fluorescent material, such as willemite, zinc sulphide or other suitable material, in a uniform film 3 of such thickness that a fluorescent image formed on the internal surface may be seen through the window 2 from a point exterior to the envelope. The internal surface of the cylindrical portion of the envelope 1 is coated with an electrically conductive film 4 of a material such as silver or graphite. Provision is made to establish an electrical contact with the conductive coating from a point external the envelope by the lead 5 sealed through the glass envelope and in contact with the conductive coating. At the end of the envelope opposite the fluorescent screen and adjacent the window 6 are mounted on the reentrant seal 7 the flat woven wire mesh members 8 and 9. These members may be perforated plates of electrically conductive material in modified forms of my invention. The member 8 may be of any suitable metal such as copper or nickel. The member 9 which is mounted adjacent the member 8 and very close thereto, is photoelectrically sensitive and may be made of silver plated copper which has been suitably oxidized and caused to be covered with a film of photoelectrically sensitive caesium or a compound thereof. The envelope, after assembly, is exhausted, preferably to a high degree of vacuum, in order to minimize the effect of ionization in the subsequent operation of the tube.

Outside the tube and mounted in a position such that an image of the object 10 may be projected on the member 9 through the window 6 is a lens 11 of a material such as, for example, rock salt, having suitable optical transmission characteristics in the region of the spectrum for which the apparatus is designed. Between the lens 11 and the window 6 is mounted an optical band pass filter 12 of some suitable material such as ebonite which is capable of passing the radiations in the desired region of the spectrum.

The battery 13 is connected between the members 8 and 9 and is so polarized that the positive potential on the member 8 draws any photoelectrons emitted by the member 9 through the interstices of the member 9 and accelerates those electrons in a direction toward itself. The battery 14, whose potential may be somewhat higher than that of the battery 13, is connected between the member 9 and the conductive coating 4 in a manner appropriate to maintain the coating 4 at a potential positive with respect to the member 9.

External to and coaxial with the tube 1 is an electromagnetic coil 24 which is so disposed that a current flowing in the coil as a result of the battery 15 and controlled by the variable resistance 16 will cause a substantially uniform magnetic field in a direction normal to the planes of the fluorescent screen and the members 8 and 9.

In operation, an infra-red image of the object 10 is projected by the lens 11 onto the photoelectrically sensitive member 9. The components of the radiation which are not desired are eliminated by the filter 12. The radiation incident upon the member 9 causes the emission of photoelectrons in quantities proportional at each element of area to the intensity of the radiation incident upon that element. The photoelectrons, under the influence of the potential on the member 8 are drawn through the interstices of the member 9, and, as a result of the proximity of the member 8 to the member 9, the paths of the electrons will be in a direction substantially normal to the members 8 and 9. A large portion of the electrons thus accelerated will be caused to pass through the interstices of the member 8 and the electrons will have reached a plane just beyond the member 8 by paths substantially parallel to the axis of the tube. Furthermore, since the electric field between the members 8 and 9 is substantially parallel to the axis of the tube, the velocity of the electrons at the instant of emergence from the interstices of the member 8 will be made up of a large component parallel to the axis of the tube and a small random radial component resulting from the initial velocity of photoelectric emission, space charge effects, and other spurious effects.

The potential applied to the conducting coating 4 may to advantage be such that a substantially field-free space is maintained in the portion of the tube between the member 8 and the fluorescent screen 3, and under these conditions the electrons emerging from the member 8 will proceed with their velocities and directions of emergence.

The electromagnetic field set up by the coil 24 is adjusted to such an intensity that the radial velocity of the electrons is just neutralized in the time of their transit from the member 8 to the fluorescent screen 3, and under these circumstances all electrons reach the screen 3 at points corresponding to the points from which they emerged from the member 8. The electrons, upon impact with the screen 3 give up their energy, and a portion of that energy is translated to visible energy, so that a visible image of the invisible object 10 appears on the screen 3.

In the modification of my invention shown in Figure 2, I have eliminated the need for the electromagnetic focusing device by greatly reducing the distance through which the radial component of the electron velocity is allowed to operate, and consequently the electrons are afforded negligible opportunity to displace themselves in a radial direction. This embodiment of my invention consists of a plane window 2 on which is placed a thin semi-transparent film of electrically conducting material 17, such as metallic silver applied by evaporation in vacuum, or by the known methods of application from chemical solutions. In the annular portion 18 of the glass envelope 19 I have provided a relatively heavy electrically conductive coating 20 in electrical contact with the film 17 and further in similar contact with the wire 21 sealed through the glass.

A fluorescent screen 3 comprising a film of such thickness that a fluorescent image formed on the internal surface of the screen may be seen through the window 2 from a point exterior to the envelope is formed on the window 2 over the film 17. Mounted on the stem 7 and parallel with and very close to the screen 3 are the accelerating member 8 and the photoelectrically sensitive member 9.

The optical system comprising the lens 11 and the filter 12 is disposed so as to produce an infrared image of the invisible object 10 on the member 9. Batteries 13 and 14 are provided as in the previous embodiment, except that the battery 14 may to good advantage be of higher potential than that used in the preceding apparatus.

The operation of this embodiment is substantially similar to that of the preceding one except that, as a result of the close proximity of the member 8 to the screen 3, and the relatively great axial acceleration imparted to the electrons by the field between the member 8 and the film 17, the time of transit of the electrons from the point of emission from the member 9 to the screen 3 is so short that the radial component of the motion is relatively negligible and consequently the points of impact of the electrons upon the screen 3 are in substantial correspondence with their points of emission from the member 9. It follows, therefore, that if an image capable of emitting photoelectrons is projected onto the member 9, by the operation of my tube a similar image is produced in visible radiations on the fluorescent screen 3.

In order to improve the sensitivity of my apparatus, I have found that it is desirable in some instances to modify the tube further as shown in Figure 3. In this embodiment, I have provided a tube and associated apparatus similar to that shown in Figure 2 but with the addition of an additional perforated member 23 and associated battery 22. In this instance the member 23 is composed of a material such as an alloy consisting of 99 percent nickel and 1 percent barium or other suitable material so that, for each high speed primary electron incident thereon, there are emitted more than one secondary electron.

In operation, then, the photoelectrons are accelerated toward the member 8 under the influence of the battery 13, and such electrons as penetrate the interstices of the member 8 are further accelerated by the battery 22 under the influence of the battery 22. A portion of the electrons which penetrate the member 8 will also penetrate the member 23 and will be accelerated to the screen 3 under the influence of the battery 14 connected to the film 17. Another part of the electrons which penetrate the member 8 will strike the member 23 at high velocity and the energy of the impact will cause a number of secondary electrons to be emitted. These secondary electrons are then accelerated toward the fluorescent screen by the potential of the battery 14 on the film 17, and the total number of electrons reaching the screen will be the sum of the photoelectrons which penetrate all accelerating members, and the secondary electrons which are added by the member 23.

The transparent film 17 has been used in this embodiment of my invention to provide a plane electrode parallel to the accelerating member 8 so that the direction of motion of the electrons will be substantially parallel to the axis of the tube. Such electrical conductivity can be provided in a number of ways. For example, the film 17 may be omitted and instead the individual particles of fluorescent material may be coated with a film of similar conductive material. Again, an electrically conductive powdered metal may be mixed with the fluorescent material in such a manner that a continuous electrical path is provided throughout the area of the screen. Still further, the fluorescent screen may consist of an additional perforated member with fluorescent material applied in accordance with my co-pending application Ser. No. 4494 filed Feb. 1, 1935, in which case some improvement in the sharpness of the reproduced image will be realized.

It is apparent that additional secondary emitting members may be added to my tube for the purpose of still further increasing the amount of secondary electrons produced and large amounts of amplification may thus be produced. Furthermore, secondary emitting characteristics may be given to the first accelerating member 8 in order to effect amplification by that member.

Moreover, the secondary emitting-amplifying members may be added to the type of tube shown in Figure 1 where electromagnetic focusing of the image is used, and in that embodiment the member 8 may be rendered secondary-emissive.

The photoelectric sensitization of the member 9 may be accomplished in any of the various manners known to those skilled in the art. It may, for example, be done by using as the base metal for the member 9 a woven wire mesh made of copper wire, plating the copper with silver, oxidizing the silver within the tube and introducing metallic caesium in a manner to enable the caesium to replace the silver in the silver oxide and allowing a film of metallic caesium to remain on the caesium oxide. Such a photoelectric surface can be produced to have appreciable sensitivity in the region of the spectrum lying between the long wave threshold of visibility and twelve thousand Ångström units. In order to provide sensitivity to wavelengths in excess of this value it is convenient to use element number 87 or ekacaesium as the photosensitive material. This metal may be shown to have photoelectric sensitivity to as long a wavelength as fourteen thousand Ångström units. These and other methods known to the art may be used to provide photoelectric sensitivity at appropriate wave lengths. Moreover, the property of secondary emission may be imparted to additional members such as 8 and 23 by these same processes of photo-sensitization, because I have found such photoelectrically sensitive surfaces to be very good emitters of secondary electrons. In some instances the ability to emit secondary electrons may be improved by somewhat modifying the process from that which produces the most sensitive surface photoelectrically.

A conducting film such as the film 17 in the embodiment shown in Figure 2 may often be used to good advantage in the tube as shown in Figure 1, although it is not essential to the operation of the latter tube because electronic charges are well disposed of by secondary emission from the fluorescent material.

The envelope, or at least the window 6, must in every case be composed of glass or other material which transmits with relatively small attenuation the radiations of the wavelengths for which the apparatus is designed to operate. There are available commercially, various kinds of glass having satisfactory transmission characteristics in the infra-red region, and others suitable for use in the ultra-violet region. As an alternate method, however, it is possible to use a window composed of some desirable material, cemented, fused or otherwise attached to an envelope made of glass in the remaining parts.

It is evident from the foregoing description of a particular embodiment that my invention is generally applicable in all fields which involve the principles of optics whenever it is required to produce a visible image of an object illuminated with invisible radiation, whether that radiation be invisible because of the complete insensitivity of the eye to radiation of the frequency involved, or because the intensity of the radiation is insufficient to create the required response in the radiation-sensitive device, whether that device be a human eye or other instrumentality.

I claim:

1. A device for electro-telescopy comprising a tube having a transparent window and provided with a fluorescent screen, a photoelectrically sensitive and apertured screen supported in said tube between said window and said fluorescent screen for the reception on its photoelectrically sensitive surface of a light image projected through said window, and electrode means for accelerating toward and focusing upon said fluorescent screen the electrons of emission from said photoelectrically sensitive surface.

2. A photoelectric device comprising a tube having a transparent window and provided with a luminescent screen, a photoelectrically sensitive member supported in said tube between said window and said luminescent screen for the reception on its photoelectrically sensitive surface of a light image projected through said window, and electrode means for accelerating toward and focusing upon said luminescent screen the electrons of emission from said photoelectrically sensitive surface, said accelerating electrode means having the property of emitting a plurality of secondary electrons upon the incidence of each primary photoelectron.

3. A photoelectric device comprising a tube containing a photoelectrically sensitive member for receiving a light image on its photoelectrically sensitive surface by which photoelectrons are emitted; light producing means for producing light from the impact of moving electrons; and electrode means for withdrawing said photoelectrons from the region of said photoelectrically sensitive member, amplifying said electrons substantially linearly and causing said electrons to impinge said light producing means at points in substantial correspondence to the points of emergence of said photoelectrons from said photoelectrically sensitive member.

4. A photoelectric device comprising means for producing photoelectrons in space relation substantially corresponding to an optical image, electrode means for linearly increasing the quantity of said photoelectrons by secondary emission, and light producing means for producing from the action of said increased quantity of electrons a visible image which is substantially a reproduction of said first optical image.

JOHN C. BATCHELOR.